United States Patent [19]

Leighton

[11] Patent Number: 5,156,083
[45] Date of Patent: Oct. 20, 1992

[54] SMOKE-FREE GRILL FOR GAS RANGES

[76] Inventor: Marilena Leighton, 230 N. Kenwood St. #122, Burbank, Calif. 91505

[21] Appl. No.: 502,476

[22] Filed: Mar. 30, 1990

[51] Int. Cl.⁵ .............................................. A47J 37/04
[52] U.S. Cl. .................... 99/421 A; 99/419; 99/421 HH; 99/446
[58] Field of Search ...................... 99/421 A, 446, 447, 99/444, 449, 419, 421 HH, 400, 425, 375; 126/41 R

[56] References Cited

U.S. PATENT DOCUMENTS

| 693,725 | 2/1902 | Leland | 99/446 |
|---|---|---|---|
| 842,749 | 1/1907 | Baguley | 99/446 |
| 1,169,831 | 2/1916 | Jeavons | 99/446 |
| 2,441,994 | 5/1948 | Pasquale | 99/446 |
| 3,049,073 | 8/1962 | Edelston | 99/446 |
| 3,301,172 | 1/1967 | Haro | 99/446 |
| 3,393,630 | 7/1968 | Pickens | 99/421 HH |
| 3,568,590 | 3/1971 | Grice | 99/446 |
| 3,987,719 | 10/1976 | Kian | 99/426 |
| 4,176,593 | 12/1979 | Terzian | 99/422 |
| 4,694,816 | 9/1987 | Fabbro | 126/41 R |

FOREIGN PATENT DOCUMENTS 0397892  2/1966  Switzerland .................. 99/421 HH Primary Examiner—William A. Cuchlinski, Jr.
Assistant Examiner—John L. Beres
Attorney, Agent, or Firm—Robbins, Dalgarn, Berliner & Carson

[57] ABSTRACT

A simple, inexpensive, easy to use, portable grill that is fuel-efficient, eliminates flaming totally and retains the natural flavor of food being grilled is provided. The portable grill is formed by the combination of a food supporting grid placed inside a grease collection pan that receives heat from a flame to one side of the pan and a cover extending past the end of the pan, to reflect the heat evenly into the pan. The portable grill can easily be adapted to accept skewers for applications such as in cooking shish kebabs.

4 Claims, 2 Drawing Sheets

SMOKE-FREE GRILL FOR GAS RANGES

BACKGROUND OF THE INVENTION

The present invention relates, in general, to improvements in cooking apparatus. More particularly, it relates to a portable grill adapted to be operated in connection with any type of gas or propane flame required range, or the like, portable or permanently installed. The cooking apparatus of the present invention is specifically designed to totally eliminate flaming, to be highly fuel efficient and retain the natural flavor of the food being grilled.

Grills have grown in popularity in recent years and grill manufacturers are continually trying to develop grills that will safely and efficiently cook meat and other foods while retaining the natural flavor of the food being cooked.

Earlier cooking apparatus, smokers, grills, broilers and ovens, gas, electric or the like, have a tendency to collect grease from food being cooked and thereby creating a cooking environment very susceptible to unwanted flaming which can burn and/or dry out meats or other foods being cooked. Furthermore, uneven cooking of the food placed on earlier cooking apparatus due to hot spots leading to inefficient use of the fuel or heat source are common.

One attempt to reduce or eliminate grease dripping away from direct contact with the flame and to reduce flaming in a grill is indirect heating by the use of reflectors.

U.S. Pat. No. 326,328 to Pillault describes a broiler that uses a reflector over a broiler plate. The smoke from the fire in a fire-box passes with the draft through passageways up and around an oven. This arrangement allows the steak while broiling not to be exposed to the smoke, gases or odors from the fire which are carried away laterally with the draft before reaching the broiler.

U.S. Pat. No. 679,130 to Tenu teaches a broiler in which the hot coals forming the fire are normally stacked up in the back part of the broiler between a fire-brick wall and against a bridge. When food in the broiler-grate is to be cooked, the coals are raked out forwardly to a position underneath the broiler-grate.

U.S. Pat. No. 2,441,924 to Pasquale describes a grill with a flame to one side of a frame supporting the food to be cooked. A transverse channel-shaped metal member on the inner face of a cover and extending across the full width thereof acts as a baffle plate under which the heated air flowing through the broiler passes close to the flame.

U.S. Pat. No. 2,694,392 to Oatley teaches the use of a heat radiating fret above a pan in a cooker and grill.

U.S. Pat. No. 2,580,925 to Jarvis describes a collapsible or demountable reflector oven. A fire is to one side of the oven and supplies heat after reflection from reflector surfaces to cook food on a tray.

U.S. Pat. No. 2,624,331 to Kennedy teaches a broiler unit that uses radiant elements normally contained in a collapsed position within an upstanding housing portion on a stove or range.

U.S. Pat. No. 4,493,308 to Hurley et al. teaches a broiler for cooking food products by radiant heating with a pair of curved reflectors to reflect upwardly radiated heat energy downwardly onto the food.

U.S. Pat. No. 2,101,180 to Jacobs teaches a portable cooker having a drawer in which the fuel is carried and the drawer is provided with an opening in the bottom to be moved into or out of alignment with openings in a support to vary the draft to the fuel.

U.S. Pat. No. 4,773,319 to Holland describes a barbecue grill using a heat deflector positioned above a heat source to evenly distribute heat throughout a housing to obviate "hot spots" and further to prevent direct contact of the heat source with the grease collection and drainage system, thereby eliminating the flaming problem.

As attested by the references described above, the quest continues for the development of a simple, easy to use, inexpensive and portable broiler or grill apparatus which eliminated flaming by completely directing grease drippings away from direct contact with the heat source while simultaneously conserving energy and preserving the tasty flavor of the food being grilled.

SUMMARY OF THE INVENTION

The present invention provides a portable grill which solves the problems associated with prior grill designs and provides for fuel efficient cooking, low or no flaming of meats and other foods without the depletion of natural flavor from the food being cooked. The portable grill is formed by the combination of a cover which extends past the end of a grease collection pan with a food supporting grid placed inside, to receive heat from a flame to one side of the pan and with the cover reflecting the heat evenly into the pan. The grill of the present invention can be adapted for use with any type of portable or permanently installed heat source and is capable of being readily handled and is inexpensive to produce and quite simple in its construction.

BRIEF DESCRIPTION OF THE DRAWINGS

The novel features which are believed to be characteristic of the invention are set forth with particularity in the appended claims. The invention itself, however, as to its organization and method of operation, may best be understood by reference to the following description taken in connection with the accompanying drawings, wherein like numerals refer to similar elements throughout and in which:

DETAILED DESCRIPTION

Figure 1:
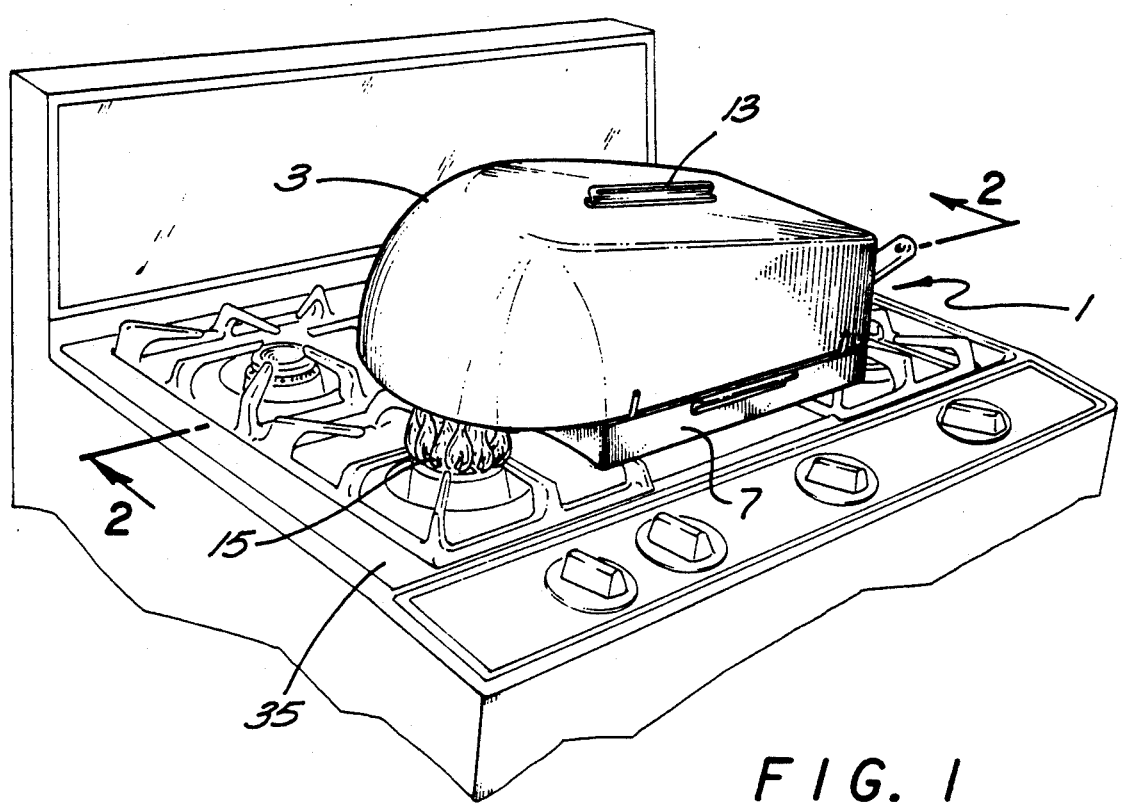
FIG. 1 is a perspective view of one embodiment of the grilling apparatus of the present invention shown adapted to be used on a conventional gas stove.
Figure 2:
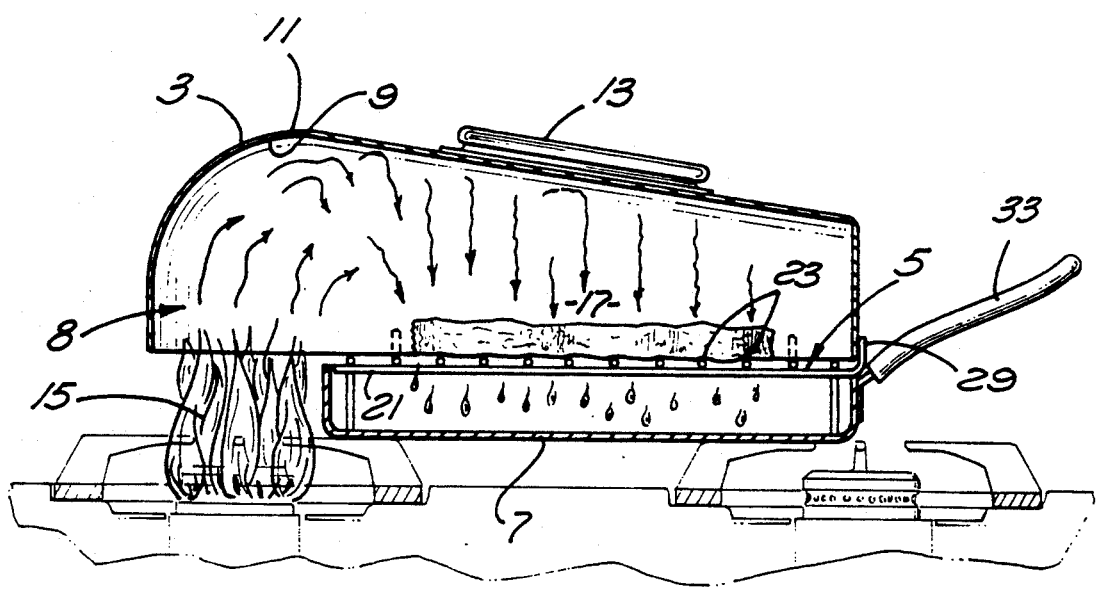
FIG. 2 is a vertical cross-sectional view of the grilling apparatus of the present invention taken along the line 2—2 of FIG. 1.
Figure 3:
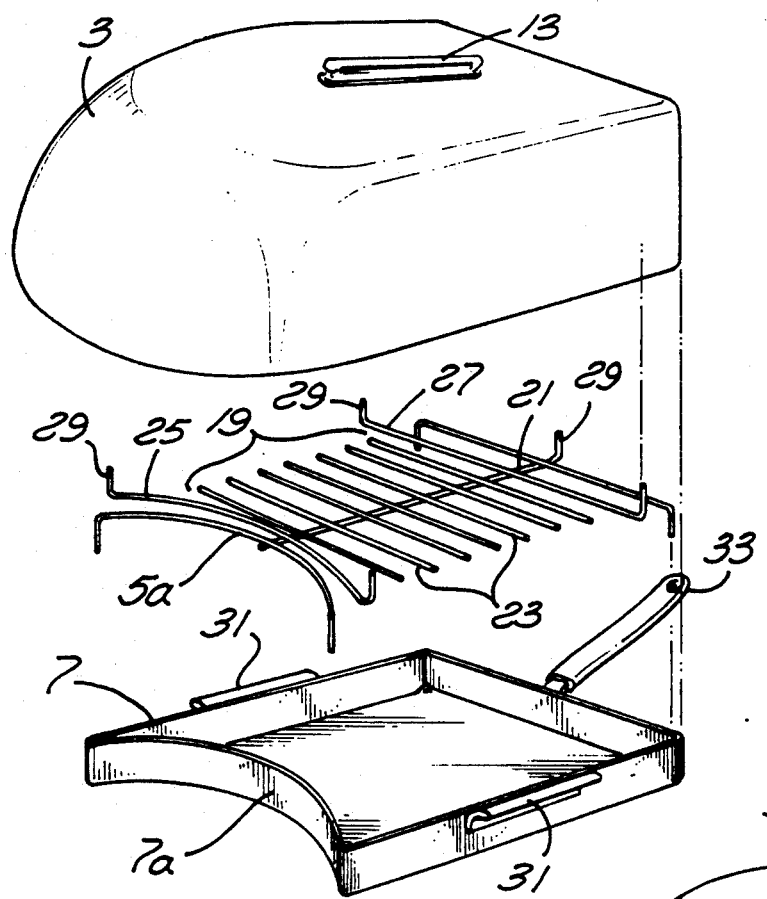
FIG. 3 is an exploded perspective view of the grilling apparatus of the present invention as shown in FIG. 1.

Referring now more specifically to the drawings, one embodiment of the portable grill and cooker of the prevent invention is shown in FIGS. 1-3 and designated generally by the numeral 1. The portable grill 1 comprises a cover 3 in connection with a food supporting grid 5 and a grease collection pan 7. The portable grill 1 is preferably made mostly of metal, such as aluminum, aluminum alloy, sheet-iron or light-gauge stainless steel, so that it is quite light and portable, rust-proof and easy to clean and repair.

The cover 3 of the portable grill 1 is of a dimension that extends past the end of the grease collection pan 7, thereby exposing a frontal receiving region 8. It further has a non-stick surface 9, such as fluoropolymers, metal oxides or the like, inside for easy cleaning and scratch resistance and a rust-proof bright polished exterior 11 with a top handle 13 for easy removal of the cover during placing or removing food onto or from the supporting grid 5. The bright inside surface 9 further acts as a reflector to direct the heat from a source 15 onto the cooking area 17 of the grill. The food supporting grid 5 is in the form of a rectangular frame with a curved front surface 5a in accordance with the geometrical shape of a heat source. The rest of the frame has a plurality of grill rods 21 and 23 which extend horizontally in the x-direction and longitudinally in the y-direction, respectively. Further, the rear end of the horizontal rod 21 and the terminal ends of the longitudinal members 25 and 27 are provided with vertical prongs 29 that fit snugly on the outside of the cover 3 and hold it in place as shown in FIG. 1.

The pan 7 is in the form of a rectangular receptacle of a width and length as to provide a tight fit to the cover 3 and food supporting grid 5 in the manner shown in FIG. 3. The front surface 7a of the pan 7 is curved inward in accordance with the geometrical shape of a heat source to prevent a flame from such heat source from accidentally contacting grease dripping from the food being cooked. The pan 7 is preferably fabricated with an even heating aluminum base with a non-stick inside surface for easy cleaning and scratch resistance. In addition, the pan 7 is provided with side handles 31 and rear handle 33, constructed of phenolic premium material providing a comfortable grip that is cool to the touch when the grill assembly is lifted or moved about. The pan can be used as a normal frying pan.

In operation, food, such as chops, steaks, potatoes, etc., can be first laid on the frame 19, followed by placing the frame inside the grease collection pan 7. Cover 3 is then positioned on top and rests on prongs 29 that protrude from the frame to the outside of the pan 7. The complete grill assembly is then placed on a gas stove or range top 35 as shown in FIG. 1. After the heat source 15 is turned on, heat rises from the source 15 through the frontal heat receiving region 8 of the cover 3 then onto the food on the supporting grid 5. When the cooking is finished, the cover 3 is lifted and the food is removed. Juices and grease are caught by the pan 7. The grid 5 can be taken out at any time and cleaned.

Figure 5:
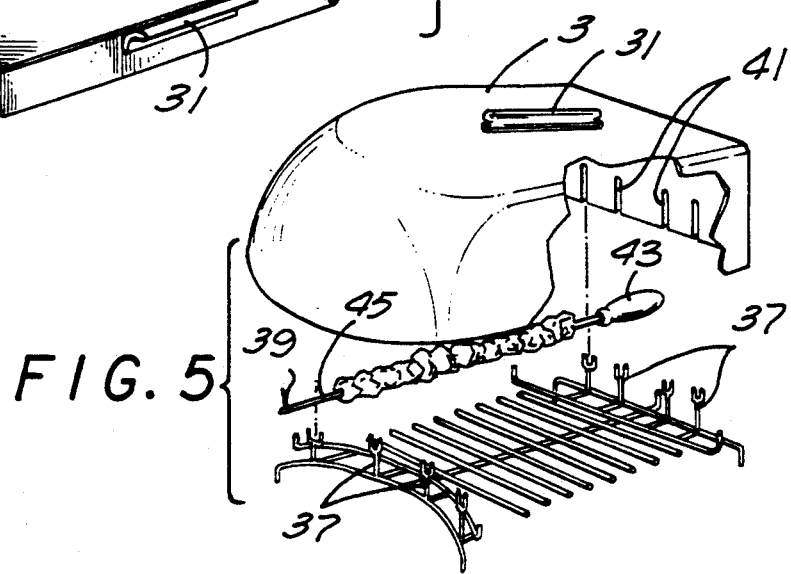
FIG. 5 is an exploded perspective view of the grilling apparatus of the present invention as shown in FIG. 4.
Figure 4:
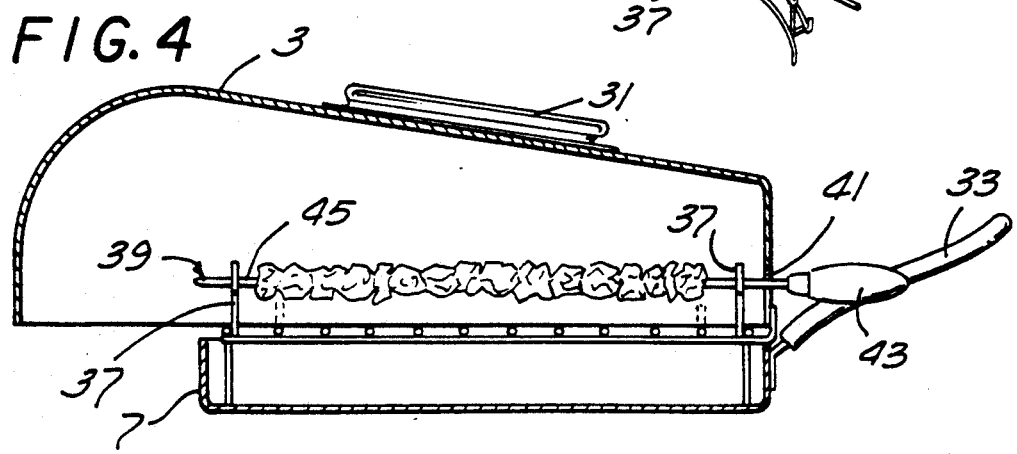
FIG. 4 is a vertical cross-sectional view of another embodiment of the grilling apparatus of the present invention shown with a food support grid specifically adapted to receive skewers.

FIGS. 4 and 5 shown another embodiment of the present invention in which the food support grid 5 and the cover 3 have been modified to specifically receive skewers. In this particular embodiment, four new horizontal grill rods in the x-direction are shown, the front and rear ends of which are provided with Y-shaped supporting members 37 to receive the skewers 39. The upper cover 3 is also provided with corresponding grooves 41, accordingly (see FIG. 5). During operation of the portable grill, after each skewer 39 has been placed on the Y-shaped supporting member 37, the cover 3 is then placed into position with the handle 43 portion of the skewer remaining on the outside of the grill for turning and the rod 45 portion of the skewer, which has the meat attached, exposed to the inside of the grill for cooking.

Those skilled in the art will fully appreciate that the preferred embodiment shown and desirable to illustrate the invention is exemplary only and that the same principles may be employed in providing a portable broiler specifically designed to totally eliminate flaming, be highly fuel efficient and retain the natural flavors of the food being broiled. It will be further appreciated that various other modifications or changes, particularly with respect to details of system construction, might be made without departing from the scope of the invention as defined in the following claims.

Having described my invention, what I claim and desire to secure by Letters Patent is:

1. A portable grill for cooking food comprising:
   a cover means which extends past one end of a grease collecting means;
   a food supporting means placed inside said grease collecting means;
   said food supporting means is further in the form of a rectangular frame with a front surface curved inward and the rest of said frame has a plurality of grid rods;
   said food supporting means is further provided with Y-shaped supporting members to receive skewers;
   said grid rods extending horizontally and longitudinally are together provided with vertical prongs to hold said cover in place during operation;
   said cover means further resting on said food supporting means to receive heat from a source to one side of said grease collecting means through a frontal heat receiving region, said heat then being reflected through said cover into food that has been placed on said supporting means;
   said cover means is further provided with corresponding grooves where a rod portion of each skewer with food attached is placed upon said Y-shaped members inside said cover for cooking and a remaining portion of each skewer with a handle is on the outside of said cover for turning; and
   said grease collecting means is further in the form of a rectangular receptacle with a front surface curved inward so as to prevent flame from said source from accidentally contacting grease dripping from the food being cooked.

2. A portable grill as set forth in claim 1, wherein further said portable grill is constructed from a metal selected from the group consisting of aluminum, aluminum alloy, sheet-iron and light-gauge stainless steel.

3. A portable grill as set forth in claim 1, wherein further said cover has a non-stick inside surface and a rust-proof bright polished exterior.

4. A portable grill as set forth in claim 1, wherein further said rectangular receptacle is fabricated from even heating aluminum base with a non-stick inside surface for easy cleaning and scratch resistance.

* * * * *